Patented Feb. 6, 1923.

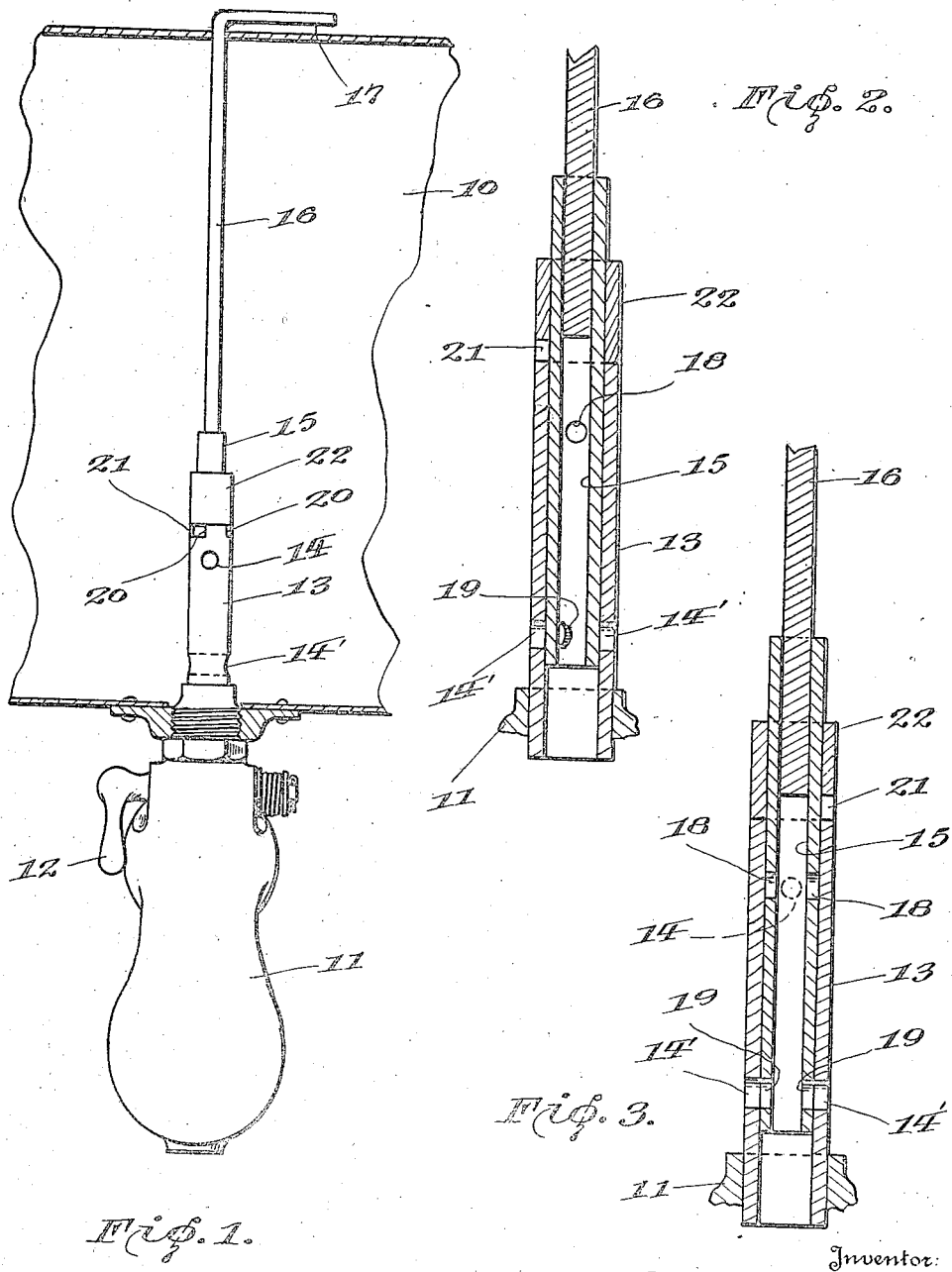

1,444,582

UNITED STATES PATENT OFFICE.

CHARLEY A. BURRIS, OF FINLEY, WASHINGTON.

RESERVE-GASOLINE VALVE.

Application filed June 7, 1921. Serial No. 475,692.

*To all whom it may concern:*

Be it known that I, CHARLEY A. BURRIS, a citizen of the United States, residing at Finley, in the county of Benton, State of Washington, have invented certain new and useful Improvements in Reserve-Gasoline Valves; and I do hereby declare the following to be a full, clear, and exact description of the invention, such as will enable others skilled in the art to which it appertains to make and use the same.

This invention relates to new and useful improvements in valves and particularly to valves used in connection with automobile gasoline tanks.

One object of the present invention is to provide a valve which is simple in construction, easy to operate, and which will readily retain a reserve supply of gasoline in a tank, when in one position, and which will permit the escape and use of the reserve supply when turned in another position.

Another object is to provide a device of this character which can be easily and quickly applied to the ordinary gasoline tank on an automobile now in use, with very slight modifications to the tank.

Other objects and advantages will be apparent from the following description when taken in connection with the accompanying drawing.

In the drawing:

Figure 1 is a vertical longitudinal sectional view through a portion of a gasoline tank, showing the invention in elevation therein.

Figure 2 is an enlarged vertical sectional view through the valve showing the same in position to retain the reserve supply.

Figure 3 is a similar view but showing the valve in position to permit the escape of the reserve supply.

Referring particularly to the accompanying drawing, 10 represents a portion of a gasoline tank to the bottom of which is secured the trap 11, a turn-plug valve 12 being carried in the upper portion of the trap. Connected to the upper end of the trap, and extending vertically within the tank, is a metal tube 13, the same having a pair of diametrically opposite openings 14 adjacent its upper end, and a similar pair of openings adjacent its lower end, these latter openings being practically at the level, or in the plane of the bottom of the tank, at 14'.

Disposed within the tube 13 is a second tube 15, which extends a short distance above the upper end of the tube 13, and has secured thereto a vertical rod 16, which rod extends upwardly through the top of the tank and is provided with a laterally turned handle 17. In the upper portion of the tube 15, and in the same horizontal plane as the openings 14, are formed the diametrically opposite openings 18, said openings being arranged to register with the said openings 14, when the tube 15 is rotated to a certain degree. In the lower portion of the tube 15, and in vertical alignment with the openings 18, are the diametrically opposite openings 19. It will be noted that the openings 14' are in different vertical lines, so that when the openings 18 register with the openings 14, the openings 19 are out of register with the openings 14', a blank portion of the tube 15 covering the latter openings 14'. The gasoline can pass from the tank, through the openings 18 and 14, down through the tubes 13 and 15, and into the trap. This causes a certain depth of gasoline to remain in the tank, equal to the height of the openings 14, from the bottom of the tank. When this reserve supply is needed, the handle 17 is grasped and the tube 15 turned to register the openings 19 with the openings 14', when the gasoline will flow from the tank through the tubes 13 and 15, to the trap.

The upper end of the tube 13 is cut away to produce the stop shoulders 20, against which the similar shoulders 21, formed on the lower end of the collar 22, of the upper end of the tube 15, are arranged to engage. By this construction the openings of the tube 15 will be brought into perfect register with the openings of the tube 13, thus preventing both the upper and lower openings 14 and 14' being partially opened and the desired reserve supply of gasoline to escape.

What is claimed is:

A valve for a gasoline tank comprising a pair of telescoped and relatively rotatable tubes, the inner tube having a pair of diametrically opposite openings in its upper end and a pair of diametrically opposite openings in its lower end, the upper and lower openings being in vertical alignment, the outer tube having diametrically opposite openings in its upper end and a pair of diametrically opposite openings in its lower end arranged at ninety degrees from the upper openings of the outer tube, the openings of the inner tube being adapted for registery with those of the outer tube, the upper end of the outer tube having an upwardly extending lug, and a collar on the upper end of the inner tube riding on the upper end of the outer tube and having a cutaway portion resulting in a pair of stop shoulders between which the lug is arranged for limiting the rotary movement of the inner tube.

In testimony whereof, I affix my signature, in the presence of two witnesses.

CHARLEY A. BURRIS.

Witnesses:
 CARL MEYERS,
 E. M. ANGELL.